Figure 1:
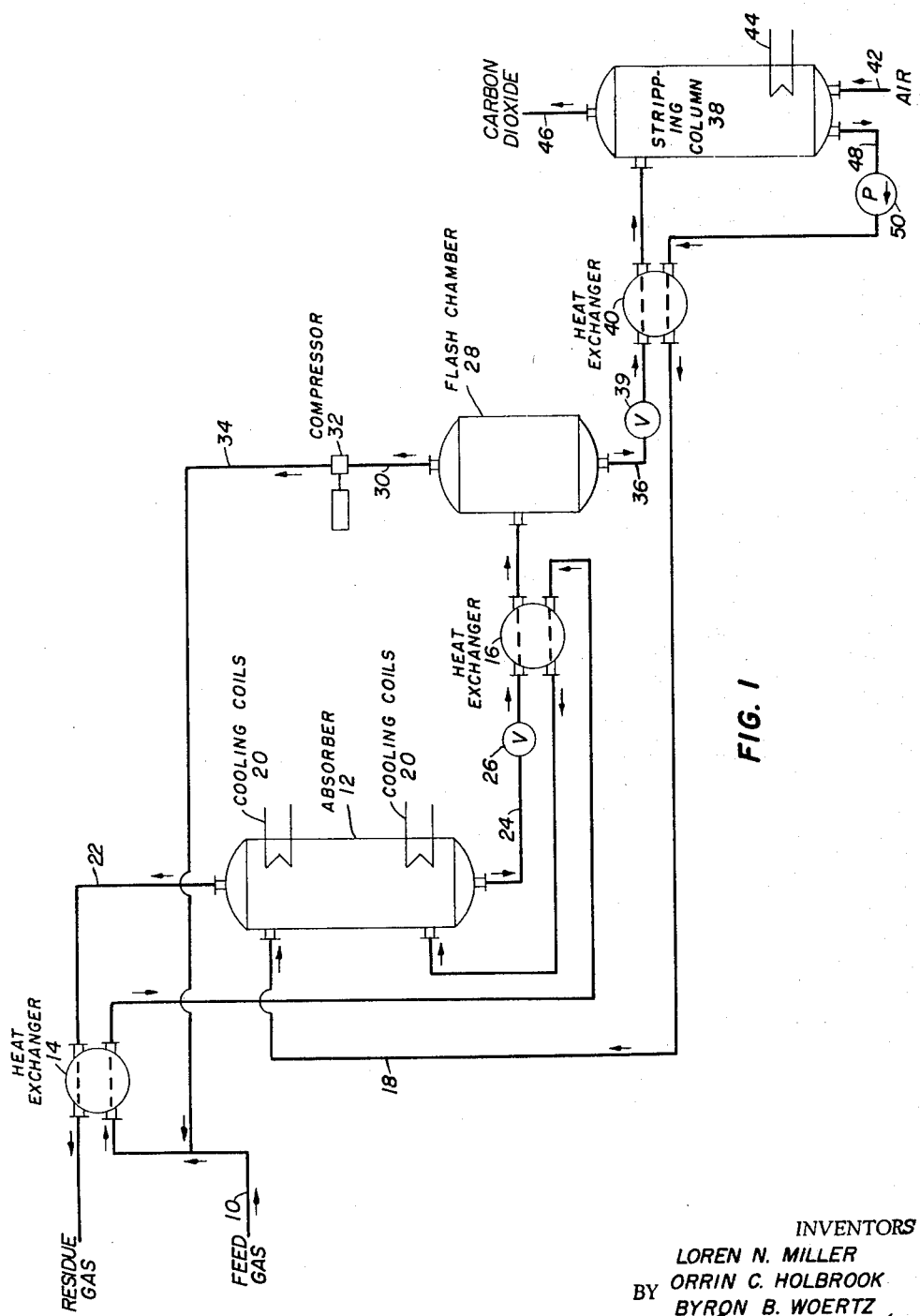

INVENTORS
LOREN N. MILLER
ORRIN C. HOLBROOK
BYRON B. WOERTZ
BY Edward H. Farg
ATTORNEY

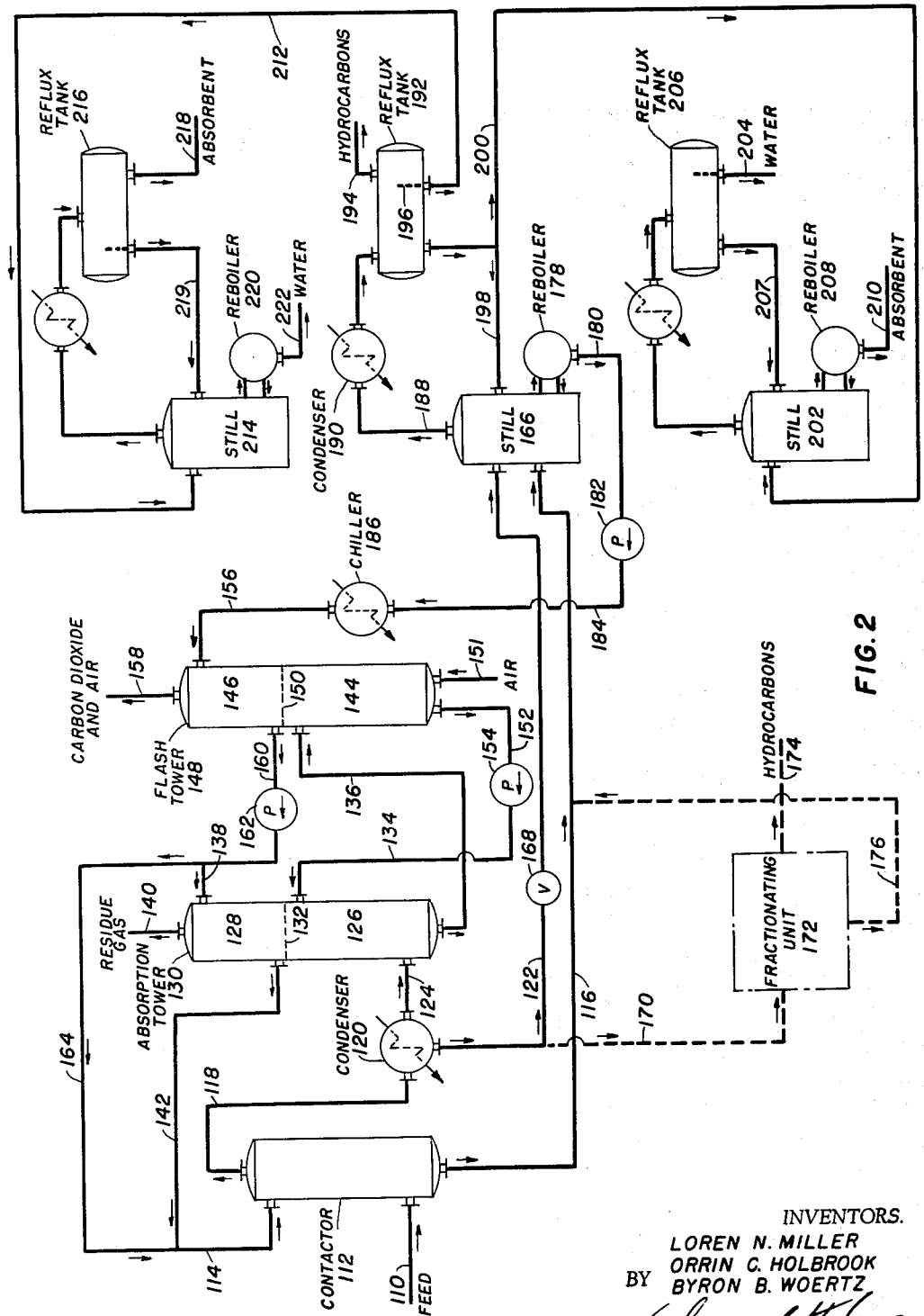

United States Patent Office 3,255,572
Patented June 14, 1966

1

3,255,572
EXTRACTION OF ACIDIC COMPONENTS FROM GAS MIXTURES
Loren N. Miller, Arvada, Colo., Orrin C. Holbrook, Andrews, Tex., and Byron B. Woertz, Crystal Lake, Ill., assignors, by mesne assignments, to Union Oil Company of California, Los Angeles, Calif., a corporation of California
Filed Dec. 11, 1962, Ser. No. 243,769
11 Claims. (Cl. 55—31)

This invention relates to a selective solvent for removing acid gases from admixtures with non-acidic constituents, and more particularly, to an improved process for the removal of carbon dioxide from a gaseous mixture of hydrocarbons and/or other non-acidic constituents containing carbon dioxide by the use of a selective solvent consisting essentially of nitromethane. This invention is especially useful for removing carbon dioxide from natural gases containing significant amounts of ethane and heavier hydrocarbons.

The acid gas content of natural gases varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example (1) hot potassium carbonate and (2) mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor. Propylene carbonate extraction is the most economical method of removing large concentrations of carbon dioxide from high pressures methane since its capacity for carbon dioxide is high and its selectivity for extracting carbon dioxide from methane is excellent. However, its

2 selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use in only very "lean" gas, i.e., gas having a low content of ethane and higher-molecular-weight hydrocarbons, its usefulness is restricted to the removal of carbon dioxide from natural gases produced from only a small percentage of existing fields.

In accordance with this invention, we have found that a selective solvent consisting of nitromethane, or of a mixture containing nitromethane, is an effective solvent for removing carbon dioxide from gaseous mixtures containing hydrocarbons and/or other non-acidic constituents. The selective solvents of this invention are also generally effective for removing hydrogen sulfide from gaseous mixtures. Nitromethane is superior to propylene carbonate with respect to selectivity in removing carbon dioxide from gaseous mixtures containing significant amounts of ethane and heavier hydrocarbons. Nitromethane is not completely miscible with water and, therefore, will not completely dehydrate a gas. However, the nitromethane-containing solvent may be utilized in combination with a second higher boiling, hygroscopic solvent, such as a glycol, to remove moisture from the gaseous mixture, as well as to recover the nitromethane which would otherwise be lost in the process.

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from natural gas containing significant amounts of ethane and higher-molecular-weight hydrocarbons. A further object of this invention is to provide a process for the removal of carbon dioxide from gaseous mixtures utilizing a superior selective solvent consisting of nitromethane or a mixture of nitromethane with another solvent. A still further object of this invention is to provide a process for removing carbon dioxide and moisture from gaseous mixtures utilizing a combination of a nitromethane-containing solvent and a second higher boiling, hygroscopic solvent, the second solvent also serving to recover nitromethane which would otherwise be lost in the process. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out the process of this invention utilizing a combination of solvents, one being a nitromethane-containing solvent and the other a higher boiling, hygroscopic solvent.

Nitromethane may be used in the pure form for absorbing carbon dioxide and in admixture with inert solvents which would serve to produce a carbon dioxide absorbent having a reduced freezing point or volatility, or modified selectivity and/or capacity for absorbing carbon dioxide. The inert solvent is defined as one which is unreactive toward the nitromethane and other absorbent constituents, and the acid constituents of the gas. In general, the nitromethane-containing solvent mixture may contain up to about 50% by volume of the inert solvent. Preferred inert solvents are liquids which are selective absorbents for carbon dioxide. Examples of suitable solvents with which nitromethane may be used in admixture include propylene carbonate, ethylene carbonate, N,N'-dimethylformamide, hydracrylonitrile, formamide, and γ-butyrolactone. Ethylene carbonate, having a melting point of about 95° F., is considered a liquid in this specification since mixtures of it with other solvents are usually liquid at ambient temperature, e.g., 70°–80° F.

The suitability of nitromethane as a selective solvent for carbon dioxide has been demonstrated experimentally in a series of tests wherein the capacity of a number of solvents for carbon dioxide and propane, and the selectivity for carbon dioxide relative to ethane and propane, were determined. Solubilities were measured by injecting a measured volume of solvent into an evacuated Dumas bulb, measuring the vapor pressure of the solvent, and then metering in sufficient carbon dioxide to bring the bulb to atmospheric pressure. A series of calculations provided a corrected solubility of carbon dioxide at 80° F. The propane solubilities were similarly measured. The ratio of the carbon dioxide solubility to the propane solubility was termed the selectivity ratio. Since scattered tests using various solvents indicated that the ethane solubilities are a direct function of the propane solubilities, the ratio of carbon dioxide solubility to the propane solubility was used to calculate the ethane selectivity. The results of this comparison are shown in Table I.

TABLE I

|  | Solvent Capacity,[1] Selectivity Ratio | | | |
|---|---|---|---|---|
|  | $CO_2$ | $C_3H_8$ | $CO_2/C_3H_8$ | $CO_2/C_2H_6$ |
| Nitroethane | 5.0 | 5.0 | 1.0 | 3.1 |
| Nitropropane | 5.0 | 7.5 | 0.7 | 2.0 |
| Nitromethane | 5.7 | 2.4 | 2.4 | 7.2 |
| Methyl Alcohol | 3.5 | 5.8 | 0.6 | 1.8 |
| Propylene Carbonate | 3.4 | 2.2 | 1.5 | 4.5 |
| Absorber Oil | 0.9 | 9.0 | 0.1 | 0.5 |

[1] Solubilities determined here are the volumes of gas dissolved, measured at 1 atmosphere and 80° F., per volume of solvent measured at 80° F., when the partial pressure of dry gas above the solvent is one atmosphere.

This comparison shows that nitromethane possesses a carbon dioxide selectivity in the presence of ethane and propane which is higher than that of nitroethane and nitropropane, the most nearly related compounds. It can be seen that while the capacity of nitromethane for carbon dioxide is over one-half greater than that of propylene carbonate, the capacity of nitromethane for propane is only slightly greater than that of propylene carbonate. This difference in the capacities of nitromethane and propylene carbonate results in nitromethane having a selectivity for extracting carbon dioxide from ethane and propane over one-half greater than that of propylene carbonate. The superiority of solvents consisting essentially of nitromethane over other solvents will be apparent from the selectivity ratios given in the above table.

The effectiveness of nitromethane relative to propylene carbonate is further demonstrated in experiments which measured the concentrations of carbon dioxide and ethane which dissolve in pure solvent at 100 p.s.i.a. gas pressure and 0° F. These values are shown in Table II.

TABLE II

|  | Nitromethane | | Propylene Carbonate | |
|---|---|---|---|---|
|  | Dissolved $CO_2$ | Dissolved Ethane | Dissolved $CO_2$ | Dissolved Ethane |
| Mol Fraction | 0.222 | 0.02195 | 0.205 | 0.0292 |
| Vol. Gas/Vol. Solvent | 116 | 9.13 | 66.9 | 7.815 |

In general, this invention contemplates the removal of carbon dioxide from gaseous mixtures containing same by treatment with a selective solvent consisting essentially of nitromethane. In addition to the treatment of natural gas containing carbon dioxide, the process of this invention is applicable to the treatment of any carbon dioxide-containing gaseous mixture as long as the solvent has a selectivity for extracting carbon dioxide from the gaseous mixture. For example, the solvent of this invention can be used for removing carbon dioxide from flue gas, or hydrogen, or reformed gas for ammonia synthesis.

The process of this invention is carried out using conventional absorption procedures, wherein the gaseous mixture is contacted with the selective solvent of this invention in either batchwise or countercurrent treatment. Successive batchwise extractions also can be used. In the preferred method of practicing the invention, the gaseous mixture to be treated is contacted in a countercurrent absorption tower with the nitromethane-containing solvent in a continuous flow method. The spent solvent is continuously withdrawn from the absorption tower and is introduced into a flash chamber and/or air-stripping column to remove the absorbed gases. Vacuum flash can be substituted for air stripping, if desired. The regenerated solvent is then recycled through the absorption tower where it is used again.

The extraction process is preferably carried out at temperatures within the range of about −50° to 100° F., although higher and lower temperatures may be utilized. It will be evident that the minimum temperature at which any specific solvent can be used is the minimum temperature at which the composition is a liquid. Pressures from about 100 to 1000 p.s.i.g. (pounds per square inch gauge) may be used. The vaporization loss of the solvent is a factor to be considered in determining the contacting conditions. The maximum contact temperature should be limited to prevent an excessive loss of the solvent. In general, the feed gas and solvent are contacted at a rate of 5 to 50 gallons of solvent per M c.f. of gas.

This invention is best understood by reference to FIGURE 1, wherein a feed gaseous mixture such as natural gas, containing carbon dioxide which is to be removed therefrom, is fed through line 10 into the bottom of absorber 12 after it passes in indirect heat exchange with the residue gas from absorber 12 in heat exchanger 14 and rich absorbent in heat exchanger 16. The nitromethane absorbent or nitromethane-containing absorbent mixture, both of which are hereinafter referred to merely as the nitromethane absorbent, is introduced into the top of absorber 12 through line 18. Absorber 12 can be any suitable absorption column, such as a vertically extended column, containing appropriate packing or trays to assure intimate countercurrent contact of the rising feed mixture with the downflowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about −50° F. to 100° F. and a carbon dioxide inlet partial pressure between 50 and 500 p.s.i.g. The amount and rate of carbon dioxide absorption increase directly with an increase in the pressure maintained in the absorption zone. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed of.

The spent nitromethane absorbent, containing absorbed carbon dioxide, is withdrawn from absorber 12 through line 24. Then, the rich absorbent undergoes a controlled pressure reduction, such as by-passing it successively through expansion valve 26, heat exchanger 16 and flash chamber 28. Flash chamber 28 is maintained at a pressure below the pressure of absorption column 12, but above atmospheric pressure, e.g., about 50 to 200 p.s.i.g. As the absorbent undergoes a pressure reduction, it is cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32, and passed through line 34 to be mixed with the feed gas before it passes through exchanger 14. The partially desorbed absorbent is withdrawn from flash chamber 28 through line 36 and fed into stripping column 38 after it has passed successively through expansion valve 29 and exchanger 40, in indirect heat exchange with the lean absorbent withdrawn from column 38.

Air or other inert stripping gas is introduced into stripping column 38 through line 42. Stripping column 38 is provided with heating coil 44 to apply heat if necessary.

In stripping column 38, substantially all of the remaining absorbed carbon dioxide is removed and withdrawn through line 46 to be disposed of as desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to further cool the lean absorbent after it has passed through heat exchanger 40.

Other alternative absorption-desorption processes will be apparent to those skilled in the art. For example if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestiges of absorbed carbon dioxide before it is recycled to the absorption column. The residue gas from the absorber and/or the flash gas may be passed through a solid bed of an absorbent, such as silica gel, activated alumina, activated carbon or a synthetic zeolite, to separate vaporized absorbent therefrom.

In an alternative embodiment of this invention, the nitromethane absorbent may be used in combination with a second higher boiling hygroscopic solvent which is absorptive of the nitromethane absorbent. The second absorbent serves to remove moisture from the feed gaseous mixture, as well as to recover nitromethane which would otherwise be lost in the product gas stream. The hygroscopic solvent is any of the polyhydric alcohols or glycols which have been proposed or used for moisture extraction, such as ethylene glycol, propylene glycol, diethylene glycol, and triethylene glycol and aqueous solutions of these. Since nitromethane is not completely water miscible, the water content of the glycol is subject to limits, if the glycol is to absorb nitromethane.

In accordance with this embodiment, the nitromethane absorbent may be used without the uneconomically high solvent losses, which are common in conventional processes. The nitromethane absorbent is used for the removal of carbon dioxide from the feed gas stream, and the hygroscopic solvent is used for the recovery of nitromethane absorbent from the effluent product gas and carbon dioxide streams, and for the removal of water from the feed gas stream.

This alternative embodiment is best understood by reference to FIGURE 2, wherein the numeral 110 represents the line through which the gas is to be treated. For example, a natural gas consisting of hydrocarbons, carbon dioxide, and moisture, is fed into the bottom of contactor 112, in which it is countercurrently contacted with a mixture of the nitromethane and hygroscopic solvents entering through line 114. Contactor 112, which may contain any suitable type and arrangement of trays or baffles as required for intimacy of contact between the absorbent mixture and feed gas, is preferably maintained at a temperature within the range of about 0° to 100° F. and pressure within the range of about 100 to 1000 p.s.i.g., although higher and lower temperatures and pressures may be used. A suitable example of the absorbent mixture entering contactor 112 through line 114 is 75–95% by weight of a glycol, such as diethylene or triethylene glycol, and 0 to 5% by weight of nitromethane and 0–20 wt. percent water. In contactor 112, a small part of the nitromethane content of solvent mixture may vaporize, and much of the water content of the feed gas stream is taken up by the glycol solvent. Glycol absorbent, containing water and some nitromethane absorbent, is withdrawn from contactor 112 through line 116. The resulting natural gas containing some nitromethane leaves contactor 112 through line 118, and flows to chiller-condenser 120, in which its temperature is reduced to absorption temperature, for example, −50° to 100° F. Condensed hydrocarbons, nitromethane and/or water are withdrawn from chiller-condenser 120 through line 122.

The chilled uncondensed components of the natural gas-nitromethane absorbent mixture pass from chiller-condenser 120 through line 124 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the down-flowing absorbent. In section 126, the gas is countercurrently contacted with nitromethane absorbent entering through line 134, which removes at least part of the acid gas constituents. Rich nitromethane containing absorbed carbon dioxide is withdrawn from absorption tower 130 through line 136. The scrubbed natural gas passes on upward in tower 130 past trap-out tray 132 into upper section 128, where it is countercurrently contacted with the glycol absorbent entering through line 138. The glycol absorbent scrubs any vaporized nitromethane absorbent from the natural gas and the scrubbed natural gas product of reduced carbon dioxide content is withdrawn through line 140 to a suitable receiver or other disposition. The mixture of glycol and nitromethane absorbents from upper section 128 is trapped on tray 132, and is withdrawn through line 142 and introduced into contactor 112 through line 114.

The nitromethane absorbent in line 136 enters a combined flashing and contacting zone which, as illustrated, may be lower flashing zone 144 and upper contacting zone 146 in a single vertically extended flash tower 148, with the upper and lower sections being separated by liquid trap-out tray 150. The rich nitromethane absorbent enters flash zone 144, which is maintained at a pressure below the absorption column pressure and usually at about atmospheric pressure, where it undergoes pressure reduction to flash-off aborbed carbon dioxide. If desired, air or other inert stripping gas is introduced into zone 144 through line 151. The lean nitromethane absorbent is withdrawn from flash zone 144 through line 152 and is introduced back to absorption tower 130 by pump 154 through line 134. Carbon dioxide and stripping gas containing entrained and vaporized nitromethane absorbent leaves flash zone 144, and it passes through trap-out tray 150 into contacting zone 146 where it is countercurrently contacted with glycol solvent entering through line 156. The glycol solvent scrubs any vaporized nitromethane absorbent from the carbon dioxide, and the carbon dioxide and stripping gas are withdrawn through line 158 to be disposed of as desired. This carbon dioxide is suitable for use in miscibly flooding oil reservoirs, if stripping gas contamination is low.

The resulting mixture of the glycol and nitromethane absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent, containing water and nitromethane, in line 116 and the condensate in line 122 are introduced into glycol still 166, with the condensate in line 122 being introduced into still 166 at a point higher than that where the liquid in line 116 is introduced. Alternatively, with valve 168 closed, condensate in line 122 is passed through line 170 into fractionating unit 172 where hydrocarbons are recovered from the condensate. The hydrocarbons are removed through line 174 and the remaining glycol and nitromethane are withdrawn through line 176 and mixed with the liquid in line 116.

Glycol still 166 is equipped with reboiler 178 from which regenerated glycol is withdrawn through line 180 and forced by pump 182 successively through line 184, chiller 186, and line 156 to contacting zone 146 of vessel 148. Overhead from still 166, comprising nitromethane absorbent, water, and hydrocarbons, is passed through line 188 and condenser 190 into reflux tank 192. Non-condensable hydrocarbon gases are vented from reflux tank 192 by line 194. Since the nitromethane absorbent is heavier than water and not completely water miscible, it is separated from the water in reflux tank 192 by providing reflux tank with short standpipe 196 through which the lighter water layer is withdrawn. The heavier nitromethane absorbent layer is withdrawn from reflux tank 192 and part of it is returned to still 166, as reflux, through 198 and the remaining portion is passed through line 200 into nitromethane still 202. Water is removed from the nitromethane absorbent in still 202 and is discarded through line 204 of reflux tank 206. Nitromethane carried overhead from still 202 with the water and separated therefrom in reflux tank 206 is returned to still 202 through line 207. Substantially dry nitromethane absorbent is removed from reboiler 208 through line 210 and returned to the system.

The water separated from the nitromethane in reflux tank 192 by standpipe 196 is passed through line 212 into water still 214. Nitromethane, which is carried overhead from still 214 with some water, is removed from reflux tank 216 through line 218, after which it is returned to the system, while the water is returned to still 214 from reflux tank 192 through line 219. Water is withdrawn from reboiler 220 of still 214 through line 222 and discarded. It will be noted that the overhead fraction of still 202 is essentially water while the overhead fraction of still 214 consists essentially of nitromethane. This difference in the overhead fractions of the stills may be explained by the relatively small degree of miscibility of the water and nitromethane, and the large difference in the relative amounts of the two phases in the stills.

Since a small amount of water in the nitromethane absorbent is not especially detrimental to its effectiveness in absorbing carbon dioxide, nitromethane still 202 may not be required in many instances. In any case, glycol still 166, nitromethane still 202, and water still 214 need be only relatively small units.

The following specific examples will serve more particularly to point out the instant invention.

*Example I*

A gaseous mixture containing 23.4% of carbon dioxide and 76.6% of methane was brought into equilibrium with nitromethane at 0° F. and 900 p.s.i.g. When analyzed, the resulting liquid phase was found to contain 33.0 mol percent of carbon dixoide, 3.4 mol percent of methane, and 63.6 mol percent of nitromethane. This indicates a solubility under these conditions of 31.0 s.c.f./gal. of carbon dioxide and 3.2 s.c.f./gal. of methane.

*Example II*

Tables III and IV are illustrative of the process streams of the process depicted in FIGURE 1 wherein a natural gas mixture is contacted in absorber 12, maintained at 600 p.s.i.a. and 0° F., with the lean absorbent. One hundred mols of the natural gas per unit time are contacted in different runs with nitromethane and propylene carbonate in such amounts that the residue gas contains 2 volume percent of carbon dioxide. The rich absorbent withdrawn from absorber 12 is flashed at 150 p.s.i.a. and 0° F. in flash chamber 28 and the pressure of the partially desorbed absorbent withdrawn from flash chamber 28 is reduced to atmospheric pressure in stripping column 38. Table III gives the compositions of the process streams where the gas is contacted with the nitromethane and, for the purpose of comparison, Table IV gives the composition of the process streams wherein the gas is contacted with the propylene carbonate.

The required solvent circulation is only 18.7 gallons of nitromethane per M c.f. of inlet gas as compared to 26.2 gal./M c.f. when using propylene carbonate (gas and solvent volumes measured at 14.7 p.s.i.a. and 60° F.). In addition, residue gas yield per 100 mols of inlet gas is 80.25 when nitromethane is used and 79.03 when propylene carbonate is used. However, the recycle gas load is higher with nitromethane, 8.32 mols vs. 6.52 mols with propylene carbonate.

TABLE III $CO_2$ ABSORPTION PROCESS USING NITROMETHANE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.00 | | 71.67 | 89.31 | 2.72 | 2.39 | 28.72 | 0.33 | 1.67 |
| Ethane | 6.00 | | 5.56 | 6.93 | 1.14 | 0.70 | 8.41 | 0.44 | 2.23 |
| Propane | 2.00 | | 1.34 | 1.67 | 1.07 | 0.41 | 4.93 | 0.66 | 3.34 |
| $CO_2$ | 19.00 | | 1.60 | 1.99 | 22.03 | 4.63 | 55.66 | 17.40 | 88.10 |
| n-Butane | 1.00 | | 0.08 | 0.10 | 1.11 | 0.19 | 2.28 | 0.92 | 4.66 |
| Nitromethane | | 110.00 | 0 | 0 | 110.00 | 0 | 0 | 0 | 0 |
| Total | 100.00 | 110.00 | 80.25 | 100.00 | 138.07 | 8.32 | 100.00 | 19.75 | 100.00 |

TABLE IV
$CO_2$ ABSORPTION PROCESS USING PROPYLENE CARBONATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.0 | | 71.56 | 89.34 | 2.53 | 2.09 | 41.8 | 0.44 | 2.21 |
| Ethane | 6.0 | | 5.46 | 6.81 | 0.99 | 0.45 | 9.0 | 0.54 | 2.71 |
| Propane | 2.0 | | 1.33 | 1.66 | 0.87 | 0.20 | 4.0 | 0.67 | 3.37 |
| $CO_2$ | 19.0 | | 1.60 | 2.00 | 19.56 | 2.16 | 43.2 | 17.40 | 87.44 |
| n-Butane | 1.0 | | 0.15 | 0.19 | 0.95 | 0.10 | 2.0 | 0.85 | 4.27 |
| Propyl. Carbon. | 0 | 98.43 | 0 | 0 | 98.43 | 0 | 0 | 0 | 0 |
| Total | 100.0 | 98.43 | 80.10 | 100.00 | 123.33 | 5.00 | 100.0 | 19.90 | 100.00 |

*Example III*

Table V is illustrative of the process streams wherein a natural gas mixture containing both carbon dioxide and hydrogen sulfide is contacted with nitromethane and then flashed and stripped under the conditions described in Example II, except the solvent circulation rate is 18.0 gallons of nitromethane per M c.f. of inlet gas. From Table V it can be seen that nitromethane is effective for removing hydrogen sulfide as well as carbon dioxide from a gaseous mixture containing same.

TABLE V
$H_2S$ AND $CO_2$ ABSORPTION PROCESS USING NITROMETHANE

| Components | Mols of Inlet Gas (Line 10) | Mols of Solvent (Line 18) | Residue Gas (Line 22) | | Mols of Rich Solvent (Line 24) | Mols of 150 p.s.i.a. Flash Gas (Line 30) | Mols of Atmos. Strip Gas (Line 46) |
|---|---|---|---|---|---|---|---|
| | | | Mols | Mol Percent | | | |
| Methane | 72.00 | | 71.61 | 89.86 | 2.67 | 2.28 | 0.39 |
| Ethane | 6.00 | | 5.49 | 6.89 | 1.10 | 0.59 | 0.51 |
| Propane | 2.00 | | 1.29 | 1.62 | 0.99 | 0.29 | 0.71 |
| $CO_2$ | 14.00 | | 1.19 | 1.50 | 14.69 | 1.88 | 12.81 |
| $H_2S$ | 5.00 | | 0.02 | 0.02 | 5.30 | 0.32 | 4.98 |
| n-Butane | 1.00 | | 0.09 | 0.11 | 1.07 | 0.15 | 0.91 |
| Nitromethane | 0 | 106.01 | 0 | 0 | 106.01 | 0 | 0 |
| Total | 100.00 | 106.01 | 79.69 | 100.00 | 131.83 | 5.51 | 20.31 |

The embodiments of the invention in which an exclusive property or privilege is claimed are defined as follows:

1. The process of removing gaseous acid gas selected from the group consisting of carbon dioxide and hydrogen sulfide from admixture with gaseous $C_1$–$C_3$ alkane hydrocarbons which comprises contacting said gaseous admixture with a liquid solvent consisting essentially of nitromethane, under conditions resulting in selective absorption of said acid gas, and separating the unabsorbed components of said gaseous admixture from said solvent.

2. The process according to claim 1 in which said acid gas is carbon dioxide and said gaseous mixture contains hydrocarbon gases of higher molecular weight than methane.

3. The process according to claim 2 in which said solvent additionally contains a minor portion of an inert liquid selected from the group consisting of propylene carbonate, ethylene carbonate, hydracrylonitrile, γ-butyrolactone, and N,N-dimethylformamide.

4. The process according to claim 1 in which said gaseous admixture contains carbon dioxide and is passed through an absorption zone at superatmospheric pressure in countercurrent contact with said solvent, a stream of rich solvent is removed from said absorption zone and the pressure thereof is reduced to flash off carbon dioxide.

5. The process according to claim 4 in which said contacting is carried out at a temperature from about −50° to 100° F. and a pressure from 100 to 1000 p.s.i.g.

6. The process of removing water and acid gas selected from the group consisting of carbon dioxide and hydrogen sulfide from admixture with gaseous $C_1$–$C_3$ alkane hydrocarbons which comprises contacting said gaseous admixture in a first contacting zone with a mixture of a first liquid solvent consisting essentially of nitromethane, and a second higher boiling liquid solvent being adapted to absorb moisture and said first solvent; separately withdrawing a liquid stream comprising said first and second solvents and a gaseous stream comprising vaporized first solvent and unabsorbed components of said gaseous admixture fed to said first contacting zone from said first contacting zone; passing said gaseous stream through a cooling zone whereby part of said gaseous stream is condensed; separately withdrawing condensate and uncondensed components of said gaseous stream from said first cooling zone, combining said condensate with said liquid stream from said first contacting zone, and separating absorbed water and second solvent from said combined solution, contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from said second contacting zone; contacting the gaseous stream from said second contacting zone in a third contacting zone with said second solvent, under conditions resulting in absorption of vaporized first solvent and water; separately withdrawing from said third contacting zone the unabsorbed components of the gaseous stream from said second contacting zone and said second solvent containing absorbed first solvent and water; recycling said second solvent from said third contacting zone to said first contacting zone; and separating the absorbed acid gas from said spent first solvent.

7. The process according to claim 6 in which the uncondensed components of said gaseous stream are passed through said second contacting zone at superatmospheric pressure in countercurrent contact with said first solvent and in which the pressure of said spent first solvent is reduced in a desorbing zone to flash off acid gas, and the acid gas separated from said spent first solvent in said desorbing zone is contacted with said second solvent in a fourth contacting zone whereby entrained vaporized first solvent is absorbed.

8. The process according to claim 7 in which said second solvent withdrawn from said first contacting zone is introduced into said fourth contacting zone after at least part of the absorbed water and first solvent are removed therefrom.

9. The process according to claim 8 in which a stream of said second solvent is removed from said fourth contacting zone and parts thereof are introduced into said first and third contacting zones.

10. The process according to claim 9 in which said first liquid solvent contains a minor portion of an inert liquid selected from the group consisting of propylene carbonate, ethylene carbonate, hydracrylonitrile, γ-butyrolactone, and N,N-dimethylformamide.

11. The process according to claim 10 in which said second solvent is a glycol and in which said gaseous admixture contains hydrocarbons of higher molecular weight than methane.

References Cited by the Examiner

UNITED STATES PATENTS

| | | | |
|---|---|---|---|
| 2,139,375 | 12/1938 | Milller et al. | 55—73 |
| 2,781,863 | 2/1957 | Bloch et al. | 55—73 X |
| 2,863,527 | 12/1958 | Herbert et al. | 55—730 X |
| 2,926,751 | 3/1960 | Kohl et al. | 55—68 X |
| 3,097,917 | 7/1963 | Dotts et al. | 55—73 X |

FOREIGN PATENTS

| | | |
|---|---|---|
| 596,692 | 4/1960 | Canada. |
| 596,693 | 4/1960 | Canada. |
| 728,444 | 4/1955 | Great Britain. |
| 750,399 | 6/1956 | Great Britain. |

OTHER REFERENCES

Mellan, Ibert, Industrial Solvents, Reinhold Publishing Corp., 330 West Forty-second St., New York, N.Y. Second edition, 1950, p. 175.

The Nitro Paraffins, Commercial Solvents Corporation, 17 East 42nd Street, New York, N.Y. 1942, pp. 4–9.

REUBEN FRIEDMAN, *Primary Examiner.*

D. E. TALBERT, *Assistant Examiner.*